US008601862B1

(12) United States Patent
Bowman et al.

(10) Patent No.: US 8,601,862 B1
(45) Date of Patent: Dec. 10, 2013

(54) SYSTEM AND METHOD FOR DETECTING MISFIRE BASED ON A FIRING PATTERN OF AN ENGINE AND ENGINE TORQUE

(75) Inventors: John V. Bowman, Farmington, MI (US); David S. Mathews, Howell, MI (US)

(73) Assignee: GM Global Technology Operations LLC

( * ) Notice: Subject to any disclaimer, the term of this patent is extended or adjusted under 35 U.S.C. 154(b) by 28 days.

(21) Appl. No.: 13/477,627

(22) Filed: May 22, 2012

(51) Int. Cl.
*G01M 15/04* (2006.01)

(52) U.S. Cl.
USPC .................................... 73/114.05; 73/114.04

(58) Field of Classification Search
USPC .......................................... 73/114.04, 114.05
See application file for complete search history.

(56) References Cited

U.S. PATENT DOCUMENTS

| | | | | |
|---|---|---|---|---|
| 7,500,470 | B2 * | 3/2009 | Buslepp et al. | 123/436 |
| 7,654,248 | B2 * | 2/2010 | Buslepp et al. | 123/436 |
| 7,941,265 | B2 * | 5/2011 | Miller et al. | 701/111 |
| 8,027,782 | B2 | 9/2011 | Assaf et al. | |
| 8,307,808 | B2 * | 11/2012 | Kaiser et al. | 123/406.23 |
| 8,392,096 | B2 * | 3/2013 | Mathews et al. | 701/111 |
| 2011/0066358 | A1 * | 3/2011 | Assaf et al. | 701/111 |
| 2011/0253100 | A1 * | 10/2011 | Kaiser et al. | 123/406.24 |
| 2011/0253101 | A1 * | 10/2011 | Mathews et al. | 123/406.27 |

* cited by examiner

*Primary Examiner* — Freddie Kirkland, III

(57) ABSTRACT

A system according to the principles of the present disclosure includes a threshold determination module and a misfire detection module. The threshold determination module determines at least one of an acceleration threshold and a jerk threshold based on a misfire type. The misfire detection module detects a misfire in a cylinder of an engine when: (i) crankshaft acceleration is less than the acceleration threshold; and/or (ii) crankshaft jerk is less than the jerk threshold. Crankshaft jerk is a derivative of crankshaft acceleration with respect to time.

20 Claims, 4 Drawing Sheets

SYSTEM AND METHOD FOR DETECTING MISFIRE BASED ON A FIRING PATTERN OF AN ENGINE AND ENGINE TORQUE

FIELD

The present invention relates to systems and methods for detecting misfire based on a firing pattern of an engine and engine torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines. When an engine misfires, an air/fuel mixture provided to a cylinder may not combust at all or may combust only partially.

Misfire detection systems have been developed to detect engine misfire. Traditional misfire detection systems, however, do not detect engine misfire as accurately as desired.

SUMMARY

A system according to the principles of the present disclosure includes a threshold determination module and a misfire detection module. The threshold determination module determines at least one of an acceleration threshold and a jerk threshold based on a misfire type. The misfire detection module detects a misfire in a cylinder of an engine when: (i) crankshaft acceleration is less than the acceleration threshold; and/or (ii) crankshaft jerk is less than the jerk threshold. Crankshaft jerk is a derivative of crankshaft acceleration with respect to time.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
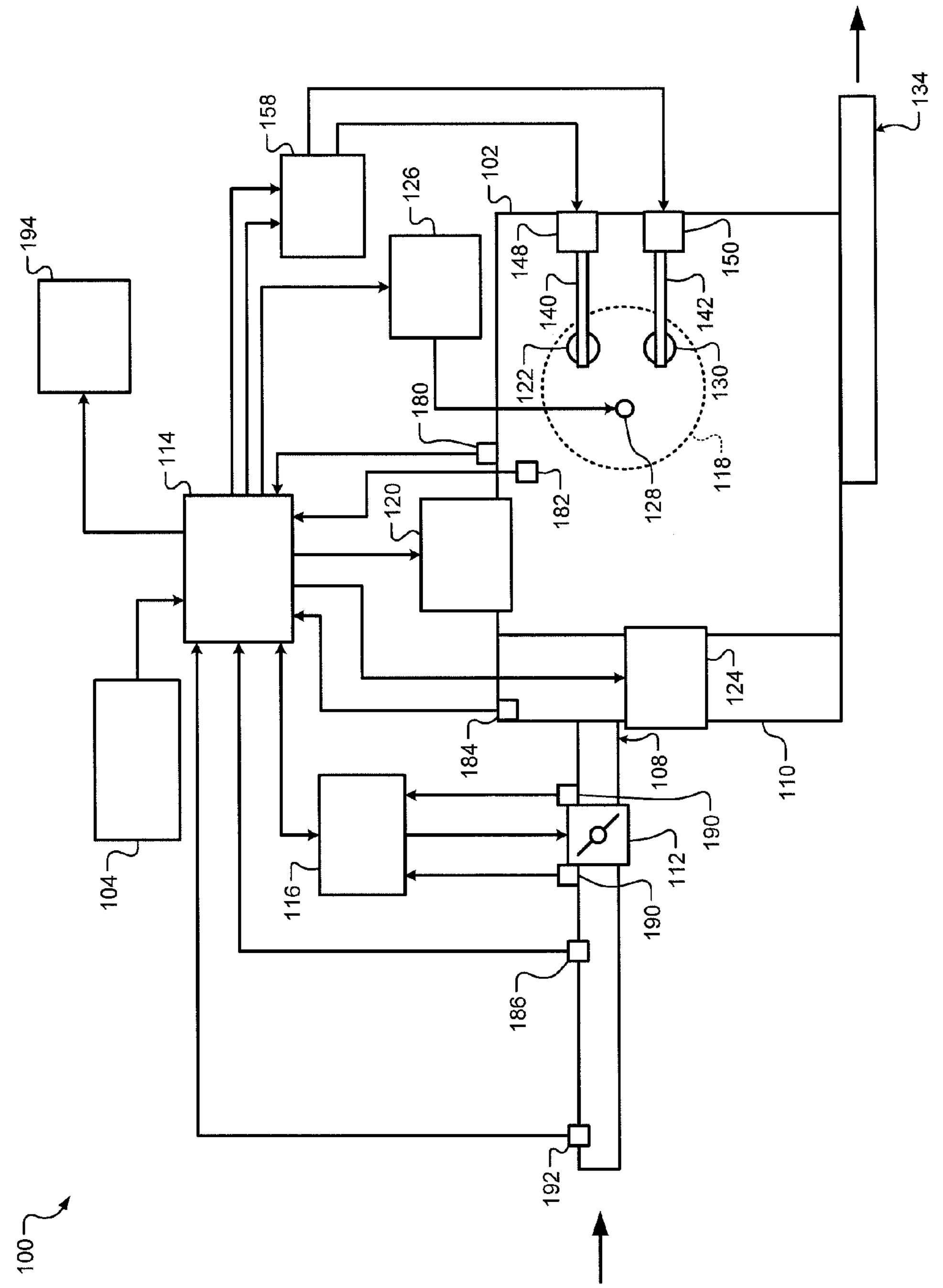
FIG. 1 is a functional block diagram of an example engine system according to the principles of the present disclosure.

A misfire detection system may detect engine misfire based on changes in engine speed. Engine misfire may reduce engine torque output and engine speed. Rough road inputs may also cause changes in engine speed when rough road inputs are transmitted to the engine through a driveline. The changes in engine speed caused by the rough roads inputs may be similar in magnitude to those caused by engine misfire. Therefore, rough roads may cause misfire detection systems to incorrectly detect engine misfire.

A misfire detection system may detect engine misfire based on crankshaft acceleration and jerk. Crankshaft acceleration is a derivative of engine speed with respect to time. Crankshaft jerk is a derivative of crankshaft acceleration with respect to time. Engine misfire may have different effects on crankshaft acceleration and jerk relative to rough road inputs. Therefore, detecting engine misfire based on crankshaft acceleration and jerk may enable a misfire detection system to distinguish between engine misfire and rough road inputs.

A misfire detection system may determine values that are inversely proportional to the crankshaft acceleration and jerk associated with a cylinder and detect engine misfire when the values are greater than a threshold. The same threshold may be used to detect different types of engine misfire such as random misfire, single-periodic misfire, and multiple-periodic misfire. Random misfire is misfire that does not occur on the same cylinder(s) from one engine cycle to another engine cycle. Single-periodic misfire is misfire that occurs in the same cylinder over multiple engine cycles. Multiple-periodic misfire is misfire that occurs in the same set of cylinders over multiple engine cycles.

Multiple-periodic misfire includes consecutive misfire, opposing-pair misfire, and bank misfire. Consecutive misfire is misfire that occurs in cylinders that are consecutive in a firing order of an engine. Opposing-pair misfire is misfire that occurs when two misfiring cylinders are one crankshaft revolution apart in the firing order. Bank misfire is misfire that occurs in every cylinder of an engine bank over multiple engine cycles.

Different types of engine misfire may have different effects on engine torque output and engine speed. The average torque output of an engine is generally higher when random misfire occurs relative to other types of engine misfire since all of the cylinders of the engine are producing torque most of the time. Thus, random misfire may reduce engine speed by a greater amount relative to other types of engine misfire.

The average torque output of an engine is generally lower when single-periodic misfire occurs relative to random misfire since single-periodic misfire consistently reduces engine torque output. Thus, single-periodic misfire may reduce engine speed by a lesser amount relative to random misfire. The average torque output of an engine is generally lower when multiple-periodic misfire occurs relative to single-periodic misfire since multiple-periodic misfire reduces the engine torque output more often than single-periodic misfire. Thus, multiple-periodic misfire may reduce engine speed by a lesser amount relative to single-periodic misfire.

Since the same threshold may be used to detect different types of misfire, and different types of misfire may have different effects on engine speed, the threshold may be more conservative than necessary for some types of misfire. For example, the same threshold may be used to detect single-periodic misfire and opposing-pair misfire. However, the threshold may be significantly (e.g., 16 percent) less than necessary to detect single-periodic misfire. Thus, using the same threshold to detect different types of misfire may cause false detections of misfire.

A misfire detection system and method according to the present disclosure determines values that are inversely proportional to crankshaft acceleration and jerk, determines a threshold based on a misfire type, and detects misfire when the values are greater than the threshold. The threshold may also be determined based on engine speed and engine load. The misfire type may include single-periodic misfire and various types of multiple-periodic misfire. A different threshold may be used for different misfire types. Thus, the threshold may be adjusted to accurately detect each misfire type without causing false misfire detections.

The misfire type may include post-deactivated misfire and pre-deactivated misfire when a cylinder is deactivated to improve fuel economy. Post-deactivated misfire is misfire that occurs in a cylinder that immediately follows a deactivated cylinder in a firing order of an engine. Pre-deactivated misfire is misfire that occurs in a cylinder that immediately precedes the deactivated cylinder in the firing order.

The misfire detection system and method may determine whether a misfire corresponds to a misfire type based on a misfire pattern for an engine cycle in which the misfire is detected. The misfire pattern may include the firing order of the misfiring cylinder(s) and the location of the misfiring cylinder(s). The misfire detection system and method may determine that a misfire is random when the misfire is detected after the misfire is not detected for a predetermined number of engine cycles. A corrective action (e.g., activate service indicator, deactivate misfiring cylinder) may be taken when a misfire count associated with a misfire type is greater than a predetermined number.

Referring to FIG. 1, an engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may determine engine speed based on input received from the CKP sensor 180. The CKP sensor 180 may include a Hall effect sensor, optical sensor, an inductor sensor, and/or another suitable type of sensor that is positioned adjacent to a disk having N teeth (e.g., 58 teeth). The disk may rotate with the crankshaft while the sensor remains stationary. The sensor may detect when the teeth pass by the sensor. The ECM 114 may determine the engine speed based on an amount of crankshaft rotation between tooth detections and a period between the tooth detections.

The ECM 114 may determine an event period associated with a cylinder event such as a firing event or a misfire. For example, for a four-cycle engine having eight cylinders, the event period may correspond to 90 degrees of crankshaft rotation. The ECM 114 may determine a first difference between the event period for a present cylinder and the event period for a previous cylinder that precedes the present cylinder in a firing order. The ECM 114 may determine a second difference between the first difference for the present cylinder and the first difference for the previous cylinder. The first and second differences are inversely proportional to crankshaft acceleration and jerk.

The ECM 114 may detect misfire in the engine 102 based on crankshaft acceleration and jerk. The ECM 114 may determine the crankshaft acceleration and jerk by differentiating the engine speed with respect to time. The ECM 114 may detect misfire based on the first and second differences. Detecting misfire based on the first and second differences may be more efficient and more accurate than detecting misfire based on crankshaft acceleration and jerk. The ECM 114 may determine different thresholds for different misfire types and detect misfire when the first and second differences are greater than the thresholds.

The ECM 114 may take a corrective action when a misfire count associated with a misfire type is greater than a predetermined number. The corrective action may include activating a service indicator 194, deactivating the cylinder(s) in which misfire is detected, and/or setting a diagnostic trouble code. The service indicator 194 delivers a visual message (e.g. text), an audible message, and/or a tactile message (e.g., vibration) indicating that a vehicle may require servicing.

Figure 2:
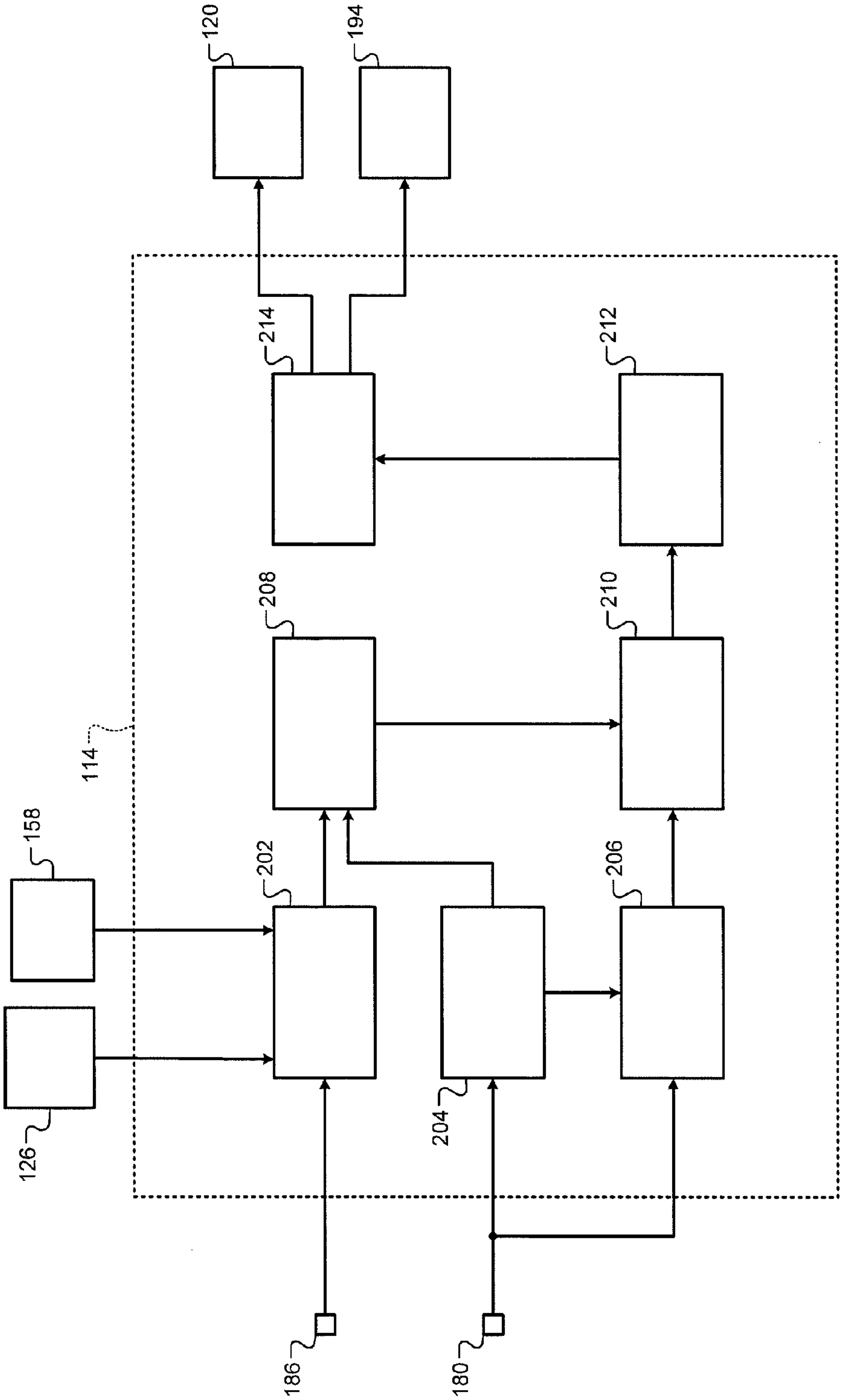
FIG. 2 is a functional block diagram of an example engine control system according to the principles of the present disclosure.

Referring to FIG. 2, the ECM 114 may include a load determination module 202, a speed determination module 204, a derivative determination module 206, a threshold determination module 208, and a misfire detection module 210. The load determination module 202 determines engine load. The load determination module 202 may determine engine load based on the mass flow rate of intake air, spark advance, and/or cam phaser position. The load determination module 202 may receive the mass flow rate, the spark advance, and the cam phaser position from the MAF sensor 186, the spark actuator module 126, and the phaser actuator module 158, respectively. Alternatively or additionally, the load determination module 202 may determine engine load based on input from a load sensor (not shown). The load determination module 202 outputs the engine load.

The speed determination module 204 determines engine speed. The speed determination module 204 may determine engine speed based on input received from the CKP sensor 180. As discussed above, the CKP sensor 180 may include a rotating disk and a stationary sensor that detects when teeth on the disk pass by the sensor. The speed determination module 204 may determine engine speed based on an amount of crankshaft rotation between tooth detections and the corresponding period. The speed determination module 204 outputs the engine speed.

The derivative determination module 206 determines derivatives of the engine speed and/or determines values that are inversely proportional to the derivatives. The derivative determination module 206 may determine crankshaft acceleration by differentiating the engine speed with respect to time. The derivative determination module 206 may determine crankshaft jerk by differentiating the crankshaft acceleration with respect to time. The derivative determination module 206 may determine values that are inversely proportional to the crankshaft acceleration and jerk. The derivative determination module 206 outputs the crankshaft acceleration and jerk and/or the values that are inversely proportional to the crankshaft acceleration and jerk.

The derivative determination module 206 may determine an event period associated with a cylinder event such as a firing event or a misfire. The derivative determination module 206 may determine a first difference between the event period for a present cylinder and the event period for a previous cylinder that precedes the present cylinder in a firing order. The derivative determination module 206 may determine a second difference between the first difference for the present cylinder and the first difference for the previous cylinder. The first and second differences are inversely proportional to the crankshaft acceleration and jerk, respectively, associated with the present cylinder.

The threshold determination module 208 determines an acceleration threshold and a jerk threshold based on a misfire type. The threshold determination module 208 may determine the acceleration and jerk thresholds for a first misfire type, such as single-periodic misfire, based on the engine speed and the engine load using a predetermined relationship.

The threshold determination module 208 may determine the acceleration and jerk thresholds for other misfire types based on a product of predetermined multipliers and the acceleration and jerk thresholds determined for the first misfire type. The other misfire types may include random misfire and various types of multiple-periodic misfire. The other misfire types may include post-deactivated misfire and pre-deactivated misfire when a cylinder in the engine 102 is deactivated.

The misfire detection module 210 detects misfire based on the crankshaft acceleration and jerk and/or the first and second differences. The misfire detection module 210 may detect a misfire when the crankshaft acceleration and the crankshaft jerk are less than the acceleration threshold and the jerk threshold, respectively. The misfire detection module 210 may detect a misfire when the first and second differences are greater than the acceleration threshold and the jerk threshold, respectively. The acceleration and jerk thresholds may be determined based on whether misfire is detected using the crankshaft acceleration and jerk or the first and second differences. Detecting misfire based on the first and second differences may involve fewer calculations and less rounding errors relative to detecting misfire based on the crankshaft acceleration and jerk.

A misfire type determination module 212 determines whether a detected misfire corresponds to a misfire type based on a misfire pattern for an engine cycle in which the misfire is detected. The misfire pattern may include the firing order of the misfiring cylinder(s) and the location of the misfiring cylinder(s). The misfire type determination module 212 may determine that a misfire is random when the misfire is detected after the misfire is not detected for a predetermined number of engine cycles.

A corrective action module 214 takes corrective action when a misfire count associated with a misfire type is greater than a predetermined number. The corrective action module 214 may take corrective action by activating the service indicator 194. The corrective action module 214 may take corrective action by instructing the cylinder actuator module 120 to deactivate the misfiring cylinder(s). The corrective action module 214 may take corrective action by setting a diagnostic trouble code.

Figure 3A:
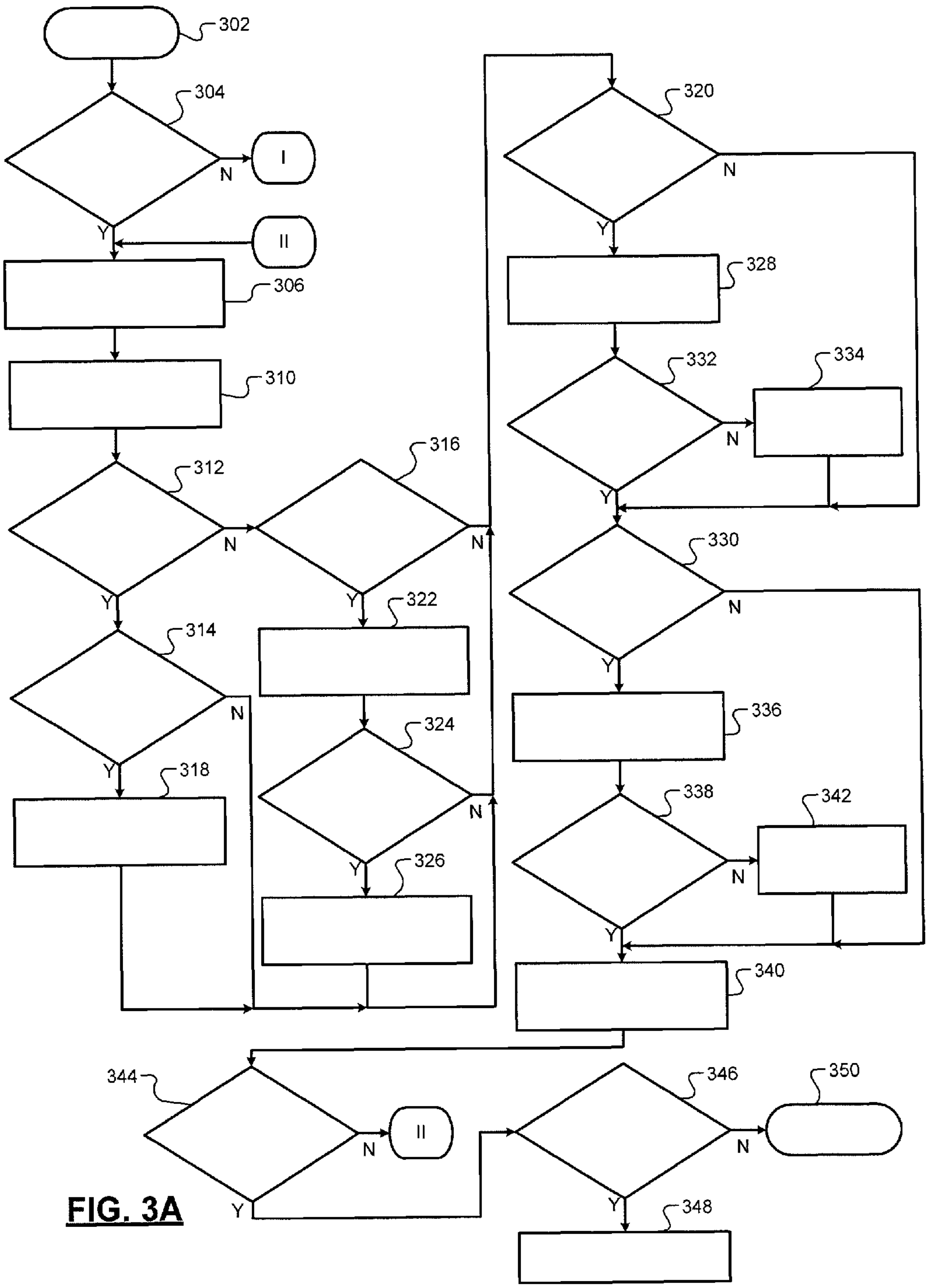
FIG. 3A is a first flowchart illustrating an example misfire detection method according to the principles of the present disclosure.

Referring to FIG. 3A, a method for detecting misfire in one or more cylinders of an engine begins at 302. At 304, the method determines whether all of the cylinders in the engine are active. If 304 is true, the method continues at 306. Otherwise, the method continues at 308 of FIG. 3B.

At 306, the method determines a first difference between an event period for a present cylinder and an event period for a previous cylinder that precedes the present cylinder in a firing order of the engine. The event period is a period that is associated with a cylinder event such as a firing event or a misfire. The event period may correspond to a predetermined range of crankshaft position (e.g., 360 degrees to 450 degrees) during an engine cycle. The first difference is inversely proportional to crankshaft acceleration associated with the present cylinder.

At 310, the method determines a second difference between the first difference for the present cylinder and the first difference for the previous cylinder. The second difference is inversely proportional to crankshaft jerk associated with the present cylinder. At 312, the method determines whether the number of engine cycles in which misfire is not detected is greater than a first value (e.g., 3). The first value may be predetermined. If 312 is true, the method continues at 314. Otherwise, the method continues at 316.

At 314, the method determines whether the first difference and the second difference are greater than emissions misfire thresholds. Emissions misfire is misfire that affects emissions levels without damaging a catalyst in an exhaust system. Emissions misfire may include random misfire that occurs at a frequency that is less than a predetermined frequency. If 314 is true, the method continues at 318. Otherwise, the method continues at 320.

At 318, the method updates an emissions misfire array. The emissions misfire array may include columns that correspond to cylinders in the engine and rows that correspond to engine cycles. The method may update the emissions misfire array by inserting a character (e.g., an "X") in a cell of the emissions misfire array to indicate that a misfire is detected in a particular cylinder during a particular engine cycle.

At 316, the method determines whether the first difference and the second difference are greater than single-periodic misfire thresholds. If 316 is true, the method continues at 322. Otherwise, the method continues at 320. The method may determine the single-periodic misfire thresholds based on engine speed and engine load using a predetermined relationship (e.g., a lookup table). The method may determine thresholds for other misfire types, such as emissions misfire, based on a product of predetermined multipliers for the misfire types and the single-periodic misfire thresholds.

The thresholds determined for each misfire type may include acceleration threshold and jerk thresholds. The thresholds may be greater than zero for most misfire types when misfire is detected based on the first and second differences. However, when consecutive misfire or post-deactivated misfire occurs, the first difference may be relatively high for two consecutive cylinder events. Thus, the second difference corresponding to the later of the two consecutive cylinder events may be near zero or less than zero. Therefore, the jerk threshold may be less than or equal to zero for consecutive misfire or post-deactivated misfire.

At 322, the method updates a single-periodic misfire array. The single-periodic misfire array may include columns that correspond to cylinders in the engine and rows that correspond to engine cycles. The method may update the single-periodic misfire array by inserting a character in a cell of the single-periodic misfire array to indicate that a misfire is detected in a particular cylinder during a particular engine cycle.

At 324, the method determines whether the first difference and the second difference are greater than consecutive misfire thresholds. If 324 is true, the method continues at 326. Otherwise, the method continues at 320. The method may determine the consecutive misfire thresholds based on a product of predetermined multipliers for consecutive misfire and the single-periodic misfire thresholds.

At 326, the method updates a consecutive misfire array. The consecutive misfire array may include columns that correspond to cylinders in the engine and rows that correspond to engine cycles. The method may update the consecutive misfire array by inserting a character in a cell of the consecutive misfire array to indicate that a misfire is detected in a particular cylinder during a particular engine cycle.

At 320, the method determines whether the first difference and the second difference are greater than opposing-pair misfire thresholds. If 320 is true, the method continues at 328. Otherwise, the method continues at 330. The method may determine the opposing-pair misfire thresholds based on a product of predetermined multipliers for opposing-pair misfire and the single-periodic misfire thresholds.

At 328, the method updates an opposing-pair misfire array. The opposing-pair misfire array may include columns that correspond to cylinders in the engine and rows that correspond to engine cycles. The method may update the opposing-pair misfire array by inserting a character in a cell of the opposing-pair misfire array to indicate that a misfire is detected in a particular cylinder during a particular engine cycle.

At 332, the method determines whether the pattern of misfire indicated by the opposing-pair misfire array satisfies an opposing-pair misfire pattern. If 332 is true, the method continues at 330. Otherwise, the method continues at 334 and clears the opposing-pair misfire array. The method may determine that the opposing-pair misfire pattern is satisfied when the opposing-pair misfire array indicates that opposing-pair misfire is detected in cylinders that are one crankshaft revolution apart in the firing order of the engine.

At 330, the method determines whether the first difference and the second difference are greater than bank misfire thresholds. If 330 is true, the method continues at 336. Otherwise, the method continues at 340. The method may determine the bank misfire thresholds based on a product of predetermined multipliers for bank misfire and the single-periodic misfire thresholds.

At 336, the method updates a bank misfire array. The bank misfire array may include columns that correspond to cylinders in the engine and rows that correspond to engine cycles. The method may update the bank misfire array by inserting a character in a cell of the bank misfire array to indicate that a misfire is detected in a particular cylinder during a particular engine cycle.

At 338, the method determines whether the pattern of misfire indicated by the bank misfire array satisfies a bank misfire pattern. If 338 is true, the method continues at 340. Otherwise, the method continues at 342 and clears the bank misfire array. The method may determine that the bank misfire pattern is satisfied when the bank misfire array indicates that bank misfire is detected in every cylinder of an engine bank over multiple engine cycles.

At 340, the method updates a final misfire array. The emissions misfire array, the single-periodic array, the consecutive misfire array, the opposing-pair misfire array, and the bank misfire array may be intermediate misfire arrays. The method may update the final misfire array by consolidating the intermediate misfire arrays into the final misfire array. The final misfire array may include columns that correspond to cylinders in the engine and rows that correspond to engine cycles. The method may update the final misfire array by inserting a character in a cell of the final misfire array to indicate that a misfire is detected in a particular cylinder during a particular engine cycle.

The final misfire array may include a misfire type column. The method may update the final misfire array by inserting a character in the misfire type column to indicate that a particular misfire type is detected during a particular engine cycle. The method may determine which intermediate misfire arrays indicate that a misfire is detected. If only one intermediate misfire array indicates that a misfire is detected during an engine cycle, the method may update the misfire type column to indicate the misfire type corresponding to the one intermediate misfire array.

If multiple intermediate misfire arrays indicate that a misfire is detected during an engine cycle, the method may select one of the misfire types corresponding to the intermediate misfire arrays and update the final misfire array to indicate the selected misfire type. The method may select the misfire type based on a predetermined priority. The predetermined priority may be directly related to the amount that each misfire type decreases the average torque output of the engine. For example, in order from highest priority to lowest priority, the predetermined priority may be: bank misfire, opposing-pair misfire, single-periodic misfire, consecutive misfire, and emissions misfire.

At 344, the method determines whether the number of engine cycles included in the intermediate misfire arrays and the final misfire array is greater than a second value (e.g., 100). The second value may be predetermined. If 344 if true, the method continues at 346. Otherwise, the method continues at 306.

At 346, the method determines whether a misfire count associated with a misfire type is greater than a third value. The third value may be predetermined and/or may be different for different misfire types. If 346 if true, the method continues at 348. At 348, the method takes a corrective action. The corrective action may include activating a service indicator, deactivating the cylinder(s) in which misfire is detected, and/or setting a diagnostic trouble code. If 346 is false, the method ends at 350.

In various implementations, the method may execute multiple misfire detection tests in the manner described above. For certain misfire types, the method may refrain from taking corrective action until the misfire count associated with the misfire type is greater than the third value for a predetermined number and/or a predetermined fraction of misfire detection tests. For example, the method may refrain from taking corrective action until the misfire count associated with emissions misfire is greater than the third value for 5 out of 16 misfire detection tests.

Figure 3B:
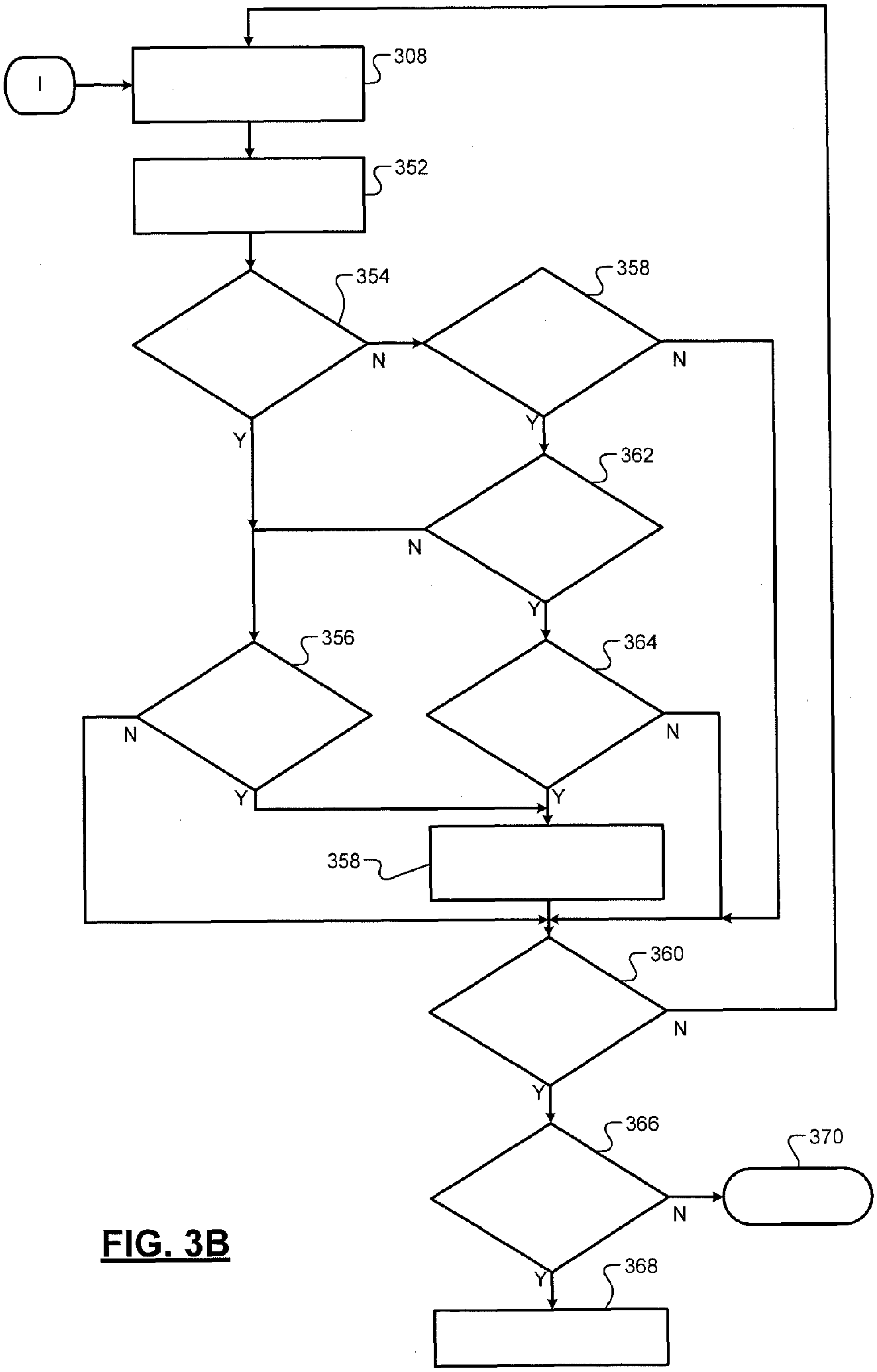
FIG. 3B is a second flowchart illustrating an example misfire detection method according to the principles of the present disclosure.

Referring to FIG. 3B, the method may analyze post-deactivated misfire and pre-deactivated misfire when one or more cylinders of the engine are deactivated. At 308, the method determines a first difference between an event period for a present cylinder and an event period for a previous cylinder that precedes the present cylinder in the firing order of the engine. The first difference is inversely proportional to crankshaft acceleration associated with the present cylinder.

At 352, the method determines a second difference between the first difference for the present cylinder and the first difference for the previous cylinder. The second difference is inversely proportional to crankshaft jerk associated with the present cylinder. At 354, the method determines whether the present cylinder is an active cylinder that immediately follows a deactivated cylinder in the firing order of the engine. If 354 is true, the method continues at 356. Otherwise, the method continues at 358.

At 356, the method determines whether the first difference and the second difference are greater than post-deactivated misfire thresholds. If 356 is true, the method continues at 358. Otherwise, the method continues at 360. The method may determine the post-deactivated misfire thresholds based on a product of predetermined multipliers for post-deactivated misfire and the single-periodic misfire thresholds.

At 358, the method determines whether the present cylinder is an active cylinder that immediately precedes a deactivated cylinder in the firing order of the engine. If 358 is true, the method continues at 362. Otherwise, the method continues at 360. At 362, the method determines whether the previous cylinder is not a cylinder that immediately follows a deactivated cylinder in the firing order of the engine. If 362 is true, the method continues at 364. Otherwise, the method continues at 356.

At 364, the method determines whether the first difference and the second difference are greater than pre-deactivated misfire thresholds. If 364 is true, the method continues at 358. Otherwise, the method continues at 360. The method may determine the pre-deactivated misfire thresholds based on a product of predetermined multipliers for pre-deactivated misfire and the single-periodic misfire thresholds.

At 358, the method updates a final misfire array. The final misfire array may include columns that correspond to cylinders in the engine and rows that correspond to engine cycles. The method may update the final misfire array by inserting a character in a cell of the final misfire array to indicate that a post-deactivated misfire or a pre-deactivated misfire is detected in a particular cylinder during a particular engine cycle.

At 360, the method determines whether the number of engine cycles included in the intermediate misfire arrays and the final misfire array is greater than the second value. If 360 if true, the method continues at 366. Otherwise, the method continues at 308.

At 366, the method determines whether a misfire count associated with a misfire type is greater than the third value. If 366 if true, the method continues at 368. At 368, the method takes a corrective action. The corrective action may include activating a service indicator, deactivating the cylinder(s) in which misfire is detected, and/or setting a diagnostic trouble code. If 366 is false, the method ends at 370.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:

a threshold determination module that determines at least one of an acceleration threshold and a jerk threshold based on a misfire type; and a misfire detection module that detects a misfire in a cylinder of an engine when at least one of: (i) a crankshaft acceleration is less than the acceleration threshold; and (ii) a crankshaft jerk is less than the jerk threshold, wherein the crankshaft jerk is a derivative of the crankshaft acceleration with respect to time.

2. The system of claim 1, wherein the threshold determination module determines the at least one of the acceleration threshold and the jerk threshold further based on engine speed and engine load.

3. The system of claim 1, wherein the misfire type includes single-period misfire and multiple-periodic misfire.

4. The system of claim 3, wherein multiple-periodic misfire includes consecutive misfire, opposing-pair misfire, and bank misfire.

5. The system of claim 1, wherein the misfire type includes post-deactivated misfire and pre-deactivated misfire.

6. The system of claim 1, wherein the threshold determination module determines the at least one of the acceleration threshold and the jerk threshold based on a firing order of the cylinder relative to a deactivated cylinder.

7. The system of claim 1, further comprising a misfire type determination module that determines whether the misfire corresponds to the misfire type based on a misfire pattern for an engine cycle in which the misfire is detected.

8. The system of claim 7, wherein the misfire pattern includes at least one of a firing order of the cylinder and a location of the cylinder.

9. The system of claim 7, wherein the misfire type determination module determines that the misfire is random when the misfire is detected after the misfire is not detected for a predetermined number of engine cycles.

10. The system of claim 1, further comprising a corrective action module that takes a corrective action when a misfire count corresponding to the misfire type is greater than a predetermined number.

11. A method comprising:

determining at least one of an acceleration threshold and a jerk threshold based on a misfire type; and detecting a misfire in a cylinder of an engine when at least one of: (i) a crankshaft acceleration is less than the acceleration threshold; and (ii) a crankshaft jerk is less than the jerk threshold, wherein the crankshaft jerk is a derivative of the crankshaft acceleration with respect to time.

12. The method of claim 11, further comprising determining the at least one of the acceleration threshold and the jerk threshold further based on engine speed and engine load.

13. The method of claim 11, wherein the misfire type includes single-period misfire and multiple-periodic misfire.

14. The method of claim 13, wherein multiple-periodic misfire includes consecutive misfire, opposing-pair misfire, and bank misfire.

15. The method of claim 11, wherein the misfire type includes post-deactivated misfire and pre-deactivated misfire.

16. The method of claim 11, further comprising determining the at least one of the acceleration threshold and the jerk threshold based on a firing order of the cylinder relative to a deactivated cylinder.

17. The method of claim 11, further comprising determining whether the misfire corresponds to the misfire type based on a misfire pattern for an engine cycle in which the misfire is detected.

18. The method of claim 17, wherein the misfire pattern includes at least one of a firing order of the cylinder and a location of the cylinder.

19. The method of claim 17, further comprising determining that the misfire is random when the misfire is detected after the misfire is not detected for a predetermined number of engine cycles.

20. The method of claim 11, further comprising taking a corrective action when a misfire count corresponding to the misfire type is greater than a predetermined number.

* * * * *